United States Patent [19]

Krafcik

[11] Patent Number: 5,614,604
[45] Date of Patent: Mar. 25, 1997

[54] COATING THICKENERS COMPRISED OF SILANE-MODIFIED POLYURETHANES

[75] Inventor: Randolph B. Krafcik, Aurora, Ohio

[73] Assignee: The Sherwin-Williams Company, Cleveland, Ohio

[21] Appl. No.: 446,094

[22] Filed: May 19, 1995

Related U.S. Application Data

[63] Continuation of Ser. No. 937,454, Aug. 27, 1992, abandoned, which is a continuation of Ser. No. 653,203, Feb. 8, 1991, abandoned.

[51] Int. Cl.$^6$ .................................................. C08G 77/22
[52] U.S. Cl. .................................. 528/28; 528/29; 528/38
[58] Field of Search .................................. 528/28, 29, 38

[56] References Cited

U.S. PATENT DOCUMENTS

| | | | |
|---|---|---|---|
| Re. 33,156 | 1/1990 | Shay et al. | 526/301 |
| 4,079,028 | 3/1978 | Emmons et al. | 260/29.6 NR |
| 4,155,892 | 5/1979 | Emmons et al. | 260/29.2 TN |
| 4,180,491 | 12/1979 | Kim et al. | 260/29.2 TN |
| 4,426,485 | 1/1984 | Hoy et al. | 524/591 |
| 4,474,933 | 10/1984 | Huber et al. | 528/29 |
| 4,496,708 | 1/1985 | Dehm et al. | 528/76 |
| 4,514,552 | 4/1985 | Shay et al. | 526/301 |
| 4,625,012 | 11/1986 | Rizk et al. | 528/28 |
| 4,650,835 | 3/1987 | Eck et al. | 525/440 |
| 4,722,962 | 2/1988 | Shay et al. | 524/548 |
| 4,735,981 | 4/1988 | Rich et al. | 524/247 |
| 4,801,671 | 1/1989 | Shay et al. | 526/214 |
| 4,857,623 | 8/1989 | Emmerling et al. | 528/28 |

Primary Examiner—Margaret W. Glass
Attorney, Agent, or Firm—Steven W. Tan; Robert E. McDonald; Heidi A. Boehlefeld

[57] ABSTRACT

This invention relates to silicon-containing polyurethane thickeners having particular utility in paints and coatings comprising the reaction product of an isocyanate functional material, a polyether polyol, a monofunctional, active-hydrogen containing, hydrophobic endcapping material, a silane-functional material, and water.

11 Claims, No Drawings

COATING THICKENERS COMPRISED OF SILANE-MODIFIED POLYURETHANES

This is a continuation of Ser. No. 07/937,454, filed on Aug. 27, 1992, now abandoned, which was in turn, a continuation of Ser. No. 07/653,203, filed on Feb. 8, 1991, now abandoned.

BACKGROUND OF THE INVENTION

This invention relates to silicon-containing, hydrophobically-modified polyurethane thickeners having particular utility in paints, coatings and other aqueous systems.

Thickeners have been known for use in paints and coatings for many years. They can be naturally occuring or synthetically manufactured. Examples of naturally occuring thickeners include alginates, casein, gum karaya, locust bean gum, cellulosics such as methyl cellulose, hydroxyethyl cellulose and hydroxypropylmethyl cellulose.

Examples of synthetic thickeners include the compositions of U.S. Pat. No. 4,079,028 (Emmons et al.), U.S. Pat. No. 4,180,491 (Kim et al.), U.S. Pat. No. 4,327,008 (Schimmel et al.), U.S. Pat. No. 4,373,083 (Seiner et al.), U.S. Pat. No. 4,426,485 (Hoy et al.), U.S. Pat. No. 4,436,862 (Tetenbaum et al.), U.S. Pat. No. 4,496,708 (Dehm et al.) and U.S. Pat. No. 4,514,552 (Shay et al.).

U.S. Pat. No. 4,079,028 purports to teach latex systems containing a low molecular weight polyurethane thickener characterized by at least three hydrophobic groups interconnected by hydrophilic polyether groups.

U.S. Pat. No. 4,180,491 purports to teach nonionic polyurethane thickeners for print pastes, which thickeners are characterized by a molecular weight of at least 10,000 and having at least three hydrophobic branching groups linked through hydrophilic polyether segments.

U.S. Pat. No. 4,327,008 purports to teach rheology modifiers useful in water-based and organic solvent-based compositions, which modifiers are derived from the reaction of polyalkylene oxide, polyfunctional material (such as polyol, amine, amine alcohol, thiol or polyisocyanate), diisocyanate, water and a monofunctional active hydrogen-containing compound or monoisocyanate.

U.S. Pat. No. 4,373,083 purports to teach a process for making rheology modifiers (particularly those of U.S. Pat. No. 4,079,028) useful in water and organic solvent-based compositions, which modifiers are derived from the reaction of polyalkylene oxide, polyfunctional material (such as polyol, amine, amine alcohol, thiol or polyisocyanate), diisocyanate, water and end-capping compounds in an organic solvent.

U.S. Pat. No. 4,426,485 purports to teach water soluble, thickeners for aqueous systems which are characterized by deliberate, arranged bunches of hydrophobes bonded to a water-soluble backbone.

U.S. Pat. No. 4,436,862 purports to teach thickeners composed of a clay stabilizer and a water-dispersable polyurethane.

U.S. Pat. No. 4,496,708 purports to teach water-soluble comb polyurethane thickeners having hydrophilic polyether backbones and pendant monovalent hydrophobic groups.

U.S. Pat. No. 4,514,552 purports to teach alkali soluble thickeners which are aqueous emulsion copolymers of a,b-monoethylenically unsaturated carboxylic acid, monoethylenically unsaturated monomer (such as ethyl acrylate), nonionic urethane monomer which is the reaction product of a monohydric surfactant and a monoisocyanate, and optionally a polyethylenically unsaturated monomer.

In addition to the above thickener art, there is a body of art relating to silane/polyurethane compositions for purposes other than thickeners. For example, U.S. Pat. No. 4,694,093 (Sugimori et al.) and U.S. Pat. No. 4,555,561 purport to teach polyurethane resins comprising (i) a urethane prepolymer prepared from a polyoxyalkylene ether polyol and/or polyester polyol and an excess amount of a polyisocyanate, and (ii) an adhesion promoting agent prepared by reacting an amine containing at least one alkoxysilyl group with an excess amount of a carbonyl compound.

U.S. Pat. No. 4,508,889 (Noren et al.) purports to teach a process for incorporating polyalkoxy amino silane adhesion promoters into isocyanate-functional polyurethane resins formed by the reaction of organic polyisocyanate with hydroxy-functional resin.

U.S. Pat. No. 3,979,344 (Bryant et al.) purports to teach sealant compounds comprising blends of N-beta-aminoethyl, gamma-amino-propyl trimethoxy silane with an organosilicon-capped isocyanate-terminated polyurethane polymer.

In contrast to the above, the present invention relates to silicon-containing, hydrophobically-modified-polyurethane thickener compositions which are particularly suited for use in paint and coating compositions.

SUMMARY OF THE INVENTION

As stated above, the present invention relates to silicon-containing, hydrophobically-modified polyurethane thickener compositions. In particular, the compositions of this invention are the reaction product of:

(1) an isocyanate functional material, preferably a diisocyanate, (2) a polyether polyol, preferably a polyalkylene oxide such as polyethylene glycol having a molecular weight between about 1000 and about 20,000, (3) a monofunctional, active-hydrogen containing, hydrophobic endcapping material, preferably a C6–C20 linear alcohol, (4) a silane-functional material, preferably an aminoalkyl silane, and (5) water.

The compositions of this invention can be linear, branched, comb-type or other complex structures, however, the linear compositions are preferred. The compositions of this invention are excellent thickeners and rheology modifying agents. These compositions are characterized by a degree of siloxane linkage formation which has a definite and desirable impact on the compositions rheology modifying properties and may enable the composition to experience bonding with appropriate substrates, such as pigment surfaces, resin surfaces and/or the substrate to be coated. This invention allows the formulator to control the level of silane incorporated into the thickener, and as a result, adjust the final rheology of paint containing the thickener. Silane incorporation specifically regulates low to medium shear rate viscosity (that is, approximately 0.01 to 500 $sec^{-1}$) to a specific desired level. This, in turn, affects the flow and levelling, applicator pickup and mixing properties of paint containing the thickener.

DETAILED DESCRIPTION OF THE INVENTION

As stated above, the compositions of this invention are silicon-containing, hydrophobically-modified polyurethane thickeners which are the reaction product of:

(1) an isocyanate functional material, preferably a diisocyanate, (2) a polyether polyol, preferably a polyalkylene oxide such as polyethylene glycol having a molecular weight between about 1000 and about 20,000, (3) a monofunctional, active-hydrogen containing, hydrophobic endcapping material, preferably a C6–C20 linear alcohol, (4) a silane-functional material, preferably an aminoalkyl silane, and (5) water.

The first starting material, an isocyanate-functional material, can be aliphatic, cycloaliphatic or aromatic, and may be used singly or in combination with other isocyanate-functional materials. The isocyanate-functional material should have at least two or more reactive isocyanate groups. Exemplary diisocyanates include the aliphatic, cycloaliphatic and aromatic diisocyanates either alone or in admixture. Generally, such diisocyanates have the formula OCN-R-NCO where R is arylene (e.g. phenylene and diphenylene), alkylarylene (e.g. dimethylbiphenylene, methylenebisphenyl and dimethylmethylenebisphenylene), alkylene (e.g. methylene, ethylene, tetramethylene, hexamethylene, a 36 methylene species, and trimethylhexylene), and acyclic (e.g. isophorone and methylcyclohexylen). Or, R can be a hydrocarbon group containing ester or ether linkages. Specific examples of such diisocyanates include 1,4-tetramethylene diisocyanate, 1,6-hexamethylene diisocyanate, 2,2,4-trimethyl-1,6-diisocyanato hexane, 1,10-decamethylene diisocyanate, 1,4-cyclohexylene diisocyanate, 4,4'-methylene bis (isocyanato cyclehexane), p-phenylene diisocyanate, 2,6-toluene diisocyanate, 2,4-toluene diisocyanate, xylene diisocyanate, isophorone diisocyanate, bis para-isocyanato cyclohexylmethane, 4,4-biphenylene diisocyanate, 4,4-methylene diphenyl isocyanate, 1,5-naphthalene diisocyanate and 1,5-tetrahydronaphthalene diisocyanate. If producing a branched composition, suitable triisocyanates include aromatic triisocyanate adduct of trimethylol propane and tolylene diisocyanate sold under the brand name Mondur CB-75, and aliphatic triisocyanate product of the hydrolytic trimerization of 1,6-hexamethylene diisocyanate, sold under the brand name Desmodur N.

Most preferred are dicyclohexylmethane-4,4'-diisocyanate sold under the brand name Desmodur W, isophorone diisocyanate, diphenylmethane-4,4'-diisocyanate sold under the brand name Mondur XP744 and isocyanurate trimer of hexamethylene diisocyanate sold under the brand name Desmodur N-3300.

The isocyanate-functional material should be used in an amount of between about 30.0% to about 40.0% (molar percent of all reactants except water), preferably between about 34.0% to about 36.0%.

The second starting material, the polyether polyol, is preferably a polyalkylene oxide such as polyethylene glycol having a molecular weight between about 1000 and about 20,000. Suitable materials include the adducts of an aliphatic, cycloaliphatic or aromatic polyhydroxy compound such as a polyhydric alcohol or polyhydric alcohol ether and an alkylene oxide such as ethylene oxide or propylene oxide. Or, they may be hydroxyl-terminated prepolymers of such adducts and an organic polyisocyanate. Mixtures of two or more such materials are also acceptable. Polyhydric alcohols include not only the simple glycols such as ethylene glycol, polyethylene glycol, propylene glycol and polypropylene glycol, but also hydroxy compounds having three or more hydroxyl groups such as polyalkylolalkanes (e.g. trimethylolpropane, pentaerythritol) and polyhydroxyalkanes (e.g. glycerol, erythritol, sorbitol, mannitol, and the like). Most preferred are the polyethylene and polypropylene oxides having molecular weights of between about 4,000 and about 20,000. Most preferred is polyethylene glycol having a molecular weight of about 8,000.

The polyether polyol component should be used in an amount of between about 14.0% to about 35.0% (molar percent of all reactants except water), preferably about 17.5% to about 25.0%.

The third starting material is a monofunctional, active-hydrogen-containing, hydrophobic endcapping material. It is preferably a C6–C20 linear alcohol; however, suitable materials can include the C1–C24 alcohols such as methanol, ethanol, hexanol, heptanol, octanol, n-decanol, dodecanol, tetradecanol, hexadecanol, and cylcohexanol; alkyl and alkaryl polyether alcohols such as straight or branched C1–C22 alkanol/ethylene oxide and alkyl phenol/ethylene oxide adducts (e.g. lauryl alcohol, t-octylphenol or nonylphenolethylene oxide adducts containing 1–250 ethylene oxide groups such as nonylphenol polyethoxylate sold under the brand name Igepal CO530); phenolics such as phenol, cresol, octylphenol, nonyl and dodecyl phenol; alcohol ethers such as the monomethyl, monoethyl and monobutyl ethers of ethylene glycol, and the analogous ethers of diethylene glycol; and other alkyl, aryl and alkaryl hydroxyl compounds including mixtures thereof.

The hydrophobic endcapping material is preferably used in an amount of between about 4.5% and about 40.0% (molar percent of all reactants except water), preferably between about 30.0% and about 39.0%.

The fourth starting material, the silane-functional material, is preferably an aminoalkyl silane. Suitable materials include the aminoalkylalkoxysilanes of the formula:

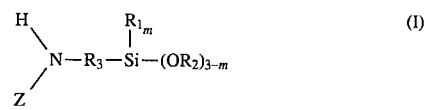

wherein R1 and R2 are the same or different and are each a straight or branched alkyl having 1 to 4 carbon atoms (e.g. methyl, ethyl, propyl, isopropyl, butyl, isobutyl, secbutyl), R3 is a divalent hydrocarbon group having 1 to 4 carbon atoms (e.g. methylene, ethylene, propylene, butylene), Z is hydrogen or an aminoalkyl having 1 to 4 carbon atoms (e.g. aminomethyl, aminoethyl, aminopropyl, aminobutyl), and m is 0, 1 or 2. Such compounds include N-(beta-aminoethyl)-aminomethyltrimethoxysilane, gamma-aminopropyltriethoxysilane (brand name A-1100 from Union Carbide), gamma-aminopropylmethyldiethoxysilane, N-(beta-aminoethyl)-gamma-aminopropyltriethoxysilane, 4-aminobutyldimethyl methoxysilane and N-(beta-aminoethyl)-gamma-aminopropylmethyldimethoxysilane. Other suitable materials include the reaction product of the above aminoalkylalkoxysilanes with a less than equimolar amount of an epoxyalkylalkoxysilane of the formula:

wherein R1, R2 and R3 are as defined above, and G is a glcycidoxy or epoxycyclohexyl group. Suitable epoxyalkylalkoxysilanes include gamma-glycidoxypropyldimethylethoxysilane, gamma-glycidoxypropymethyldiethoxysilane, gamma-glycidoxypropyltrimethoxysilane, beta-(3,4-epoxycyclohexyl) ethyltrimethoxysilane, and beta-(3,4-epoxycyclohexyl) ethylmethyldimethoxysilane.

The silane-functional material is preferably used in an amount of between about 2.5% and about 38.0% (molar percent of all reactants except water), preferably between about 5.0% and about 18.0%.

The fifth starting material, water, is necessary to cause the silane-functionality of the material to undergo siloxane bond formation. It is important that the water not be present during the reaction of the first four starting materials as it will consume the isocyanate functionality of the first starting material. In fact, it is highly preferred that the reaction of the first four starting materials be conducted under substantially anhydrous conditions. This can be accomplished by prior drying of the first four starting materials using azeotropic distillation. After completion of the reaction of the first four starting materials, the water can be added to the reaction vessel. It should be present in an amount of between about 0.15 grams and about 8 grams per gram of silane-functional material, preferably in an amount of between about 2 grams and about 6 grams per gram of silane-functional material.

The following represents one preferred procedure for producing the compositions of this invention. It should be appreciated that additional procedures are available and can be adapted to provide the compositions of this invention. It should be further appreciated that the selection of individual starting materials can and will have unique effects upon the reaction parameters. One of ordinary skill in the art should be able to appreciate and compensate for these effects.

The preferred procedure comprises charging the polyether polyol to a reactor equipped with a nitrogen blanket along with an optional, though preferred, solvent. The solvent should be selected so as to be nonreactive with the isocyanate-functional material. It should be compatible with the polyether polyol material and capable of dissolving the resultant urethane products. Suitable solvents include benzene, toluene, xylene, and other well-known non-active hydrogen solvents high in aromatic hydrocarbon contents such as Solvesso 100 and Solvesso 150, ethyl acetate, butyl acetate, and dialkyl ethers of alkylene glycol, dialkylene glycol, dipropyleneglycol monomethyletheracetate, N-methylpyrrolidone and the like.

The polyether polyol should be stirred and heated to about 100–120 degrees C. Any residual water in the reaction vessel or reactants should be azeotropically removed at this time. The temperature of the reactor is then reduced to a temperature of about 65–75 degrees C. and the isocyanate-functional material is added, followed by a catalyst such as dibutyl tin dilaurate over a time period of about three hours or until the reaction viscosity is about 50–100 poise and the percent of free isocyanate is about 0.2–0.3% by weight of reaction mixture present.

The polyether polyol and the isocyanate-functional material undergo a polymerization reaction to build a compound with an average molecular weight distribution of between about 15,000 and about 50,000 (Mn by gel permeation chromatography). The molecular weight of the compound is partially controlled by the ratio of equivalents of OH:NCO of the starting materials. Higher molecular weight polymers are produced when the OH:NCO ratio approaches 1:1.

In a separate container, blend the hydrophobic endcapper and the silane-functional material along with an optional solvent selected from the group described above, such as toluene. Add this mixture to the reaction vessel over a time period of about forty-five minutes. Hold the reaction temperature at 65–75 degrees C. for about one hour and forty-five minutes after the addition of this mixture or until the percent of free isocyanate is about 0%. The actual amount of free isocyanate left after the polymerization is dependent upon the level of endcapping material and silane-functional material added to the reaction vessel. Preferably, enough equivalents of both materials are added so as to theoretically react all of the isocyanate-functional material.

Charge the water and hold for about one hour to allow for siloxane formation.

The following examples are intended to exemplify this invention. They are not intended to limit the scope of this invention.

EXAMPLES

Four thickener compounds were produced with varying levels of encapping material and silane-functional material as follows:

| Material | EX. I grams (eq) | EX. II grams (eq) | EX. III grams (eq) | EX. IV grams (eq) |
|---|---|---|---|---|
| Toluene | 200.0 (—) | 200.0 (—) | 200.0 (—) | 200.0 (—) |
| Des W | 13.1 (.10) | 14.4 (.11) | 15.7 (.12) | 17.0 (.13) |
| PEG8000 | 240.0 (.06) | 240.0 (.06) | 240.0 (.06) | 240.0 (.06) |
| C8 alc. | 5.2 (.04) | 5.2 (.04) | 5.2 (.04) | 5.2 (.04) |
| Silane | 0.0 (0.0) | 1.1 (.01) | 2.2 (.02) | 3.3 (.03) |

Each compound was made according to the following procedure. Charge toluene and PEG 8000 (polyethylene glycol Mw approx 8000) to a reaction vessel. Begin agitation at about 200 rpm. Heat to 110 degrees C. and begin nitrogen purge. Remove residual water azeotropically for approximately one hour. Cool the contents to approximately 68 degrees C. Charge Desmodur W (dicyclohexylmethane-4,4'-diisocyanate). Charge dibutyltin dilaurate catalyst and react for approximately three hours at 68 degrees C. while sampling every hour for reaction viscosity and percent free isocyanate. In a separate vessel, blend C8 linear alcohol and A-1100 (gamma-aminopropyltriethoxysilane). Pump this mixture into the reaction vessel over a 45 minute period of time. Hold the reaction at 68 degrees C. for approximately one hour forty-five more minutes while monitoring percent free isocyanate every 30 minutes. When the percent free isocyanate reaches 0%, charge water to the reaction vessel and maintain the temperature at 68 degrees C. for approximately one additional hour. Remove the toluene from the system by nitrogen sparging at 4 liters/min. During the nitrogen sparge, sample for viscosity and % solids every hour. Add butyl carbitol as necessary to maintain viscosity at about 400 poise. Continue nitrogen sparge until toluene is no longer present in sampling. Dilute to 20% solids content with butyl carbitol and water.

Each of the above compounds was added to a commercial vinyl acrylic latex paint (The Sherwin-Williams Company, Classic 99® semi-gloss latex paint) in an amount of 25 g thickener (20% solids) per 1000 g paint. Paint viscosities were measured by a Stormer viscometer (50 to 200 sec$^{-1}$ shear rate, Krebs Units) and a cone and plate rheometer (10,000 sec$^{-1}$ shear rate) and tabulated as follows:

| EX. | KU | High Shear Visc (10,000 sec$^{-1}$) |
|---|---|---|
| I | 89 | 1.7 |
| II | 85 | 1.5 |
| III | 92 | 1.7 |
| IV | 100 | 1.7 |

What is claimed is:

1. A thickener composition comprising the reaction product of:
   (a) an isocyanate functional material,
   (b) a polyether polyol,
   (c) a monofunctional, active-hydrogen containing, hydrophobic endcapping material selected from the group consisting of C1–C24 alcohols, alkyl and alkaryl polyether alcohols; phenolics; alcohol ethers; and mixtures thereof,
   (d) an aminoalkyl silane material, and
   (e) water.

2. The thickener composition of claim 1 wherein said isocyanate functional material is a diisocyanate or triisocyanate.

3. The thickener composition of claim 2 wherein said isocyanate functional material is selected from the group consisting of dicyclohexylmethane-4,4'-diisocyanate, isophorone diisocyanate, diphenylmethane-4,4'-diisocyanate and isocyanurate trimer of hexamethylene diisocyanate.

4. The thickener composition of claim 2 wherein said polyether polyol is selected from the group consisting of:
   (a) the adducts of an aliphatic, cycloaliphatic or aromatic polyhydroxy compound and an alkylene oxide;
   (b) the hydroxyl-terminated prepolymers of the adducts of part (a) and an organic polyisocyanate;
   (c) mixtures of two or more of the materials of parts (a) and (b);
   (d) polyalkylolalkanes; and
   (e) polyhydroxyalkanes.

5. The thickener composition of claim 1 wherein said monofunctional, active-hydrogen containing, hydrophobic endcapping material is selected from the group consisting of C6–C20 linear alcohols and mixtures thereof.

6. The thickener composition of claim 1 wherein said silane-functional material is an aminoalkylalkoxysilane of the formula:

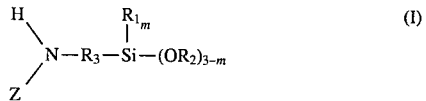 (I)

wherein R1 and R2 are the same or different and are each a straight or branched alkyl having 1 to 4 carbon atoms, R3 is a divalent hydrocarbon group having 1 to 4 carbon atoms, Z is hydrogen or an aminoalkyl having 1 to 4 carbon atoms, and m is 0, 1 or 2;

or wherein said silane-functional material is the reaction product of the above aminoalkylalkoxysilane with a less than equimolar amount of an epoxyalkylalkoxysilane of the formula:

 (II)

wherein R1, R2, R3, and m are as defined above, and G is a glycidoxy or epoxycyclohexyl group.

7. The composition of claim 6 wherein said aminoalkylalkoxysilane is selected from the group consisting of N-(beta-aminoethyl)-aminomethyltrimethoxysilane, gamma-aminopropyltriethoxysilane, gamma-aminopropylmethyldiethoxysilane, N-(beta-aminoethyl)-gamma-aminopropyltriethoxysilane, and N-(beta-aminoethyl)-gamma-aminopropylmethyldimethoxysilane.

8. The composition of claim 6 wherein said epoxyalkylalkoxysilanes is selected from the group consisting of gamma-glycidoxypropyldimethylethoxysilane, gamma-glycidoxypropymethyldiethoxysilane, gamma-glycidoxypropyltrimethoxysilane, beta-(3,4-epoxycyclohexyl) ethyltrimethoxysilane, and beta-(3,4-epoxycyclohexyl) ethylmethyldimethoxysilane.

9. The thickener composition of claim 6 wherein R1 and R2 are each selected from the group consisting of methyl, ethyl, propyl, isopropyl, butyl, isobutyl and secbutyl.

10. The thickener composition of claim 6 wherein R3 is selected from the group consisting of methylene, ethylene, propylene and butylene.

11. The thickener composition of claim 6 wherein Z is hydrogen or an aminoalkyl selected from the group consisting of aminomethyl, aminoethyl, aminopropyl and aminobutyl.

* * * * *